June 13, 1933.  R. RUDDELL  1,913,514
MACHINE FOR AND METHOD OF PERFORATING JACQUARD CARDS
Filed Aug. 23, 1929   14 Sheets-Sheet 1
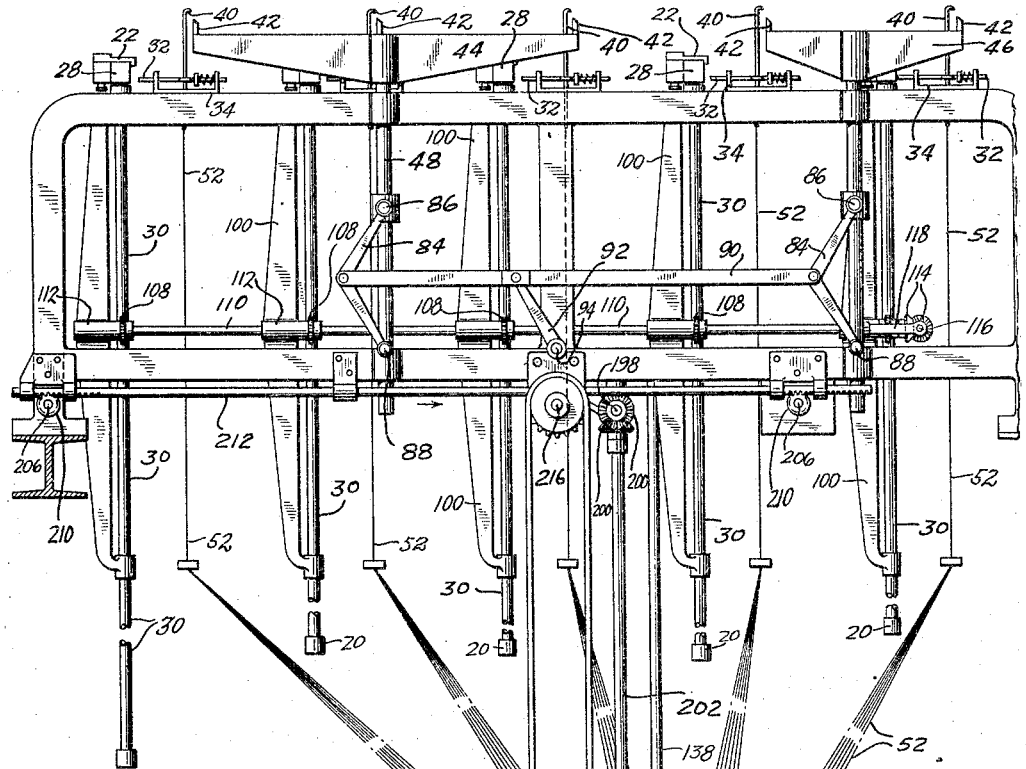
Fig. 1.
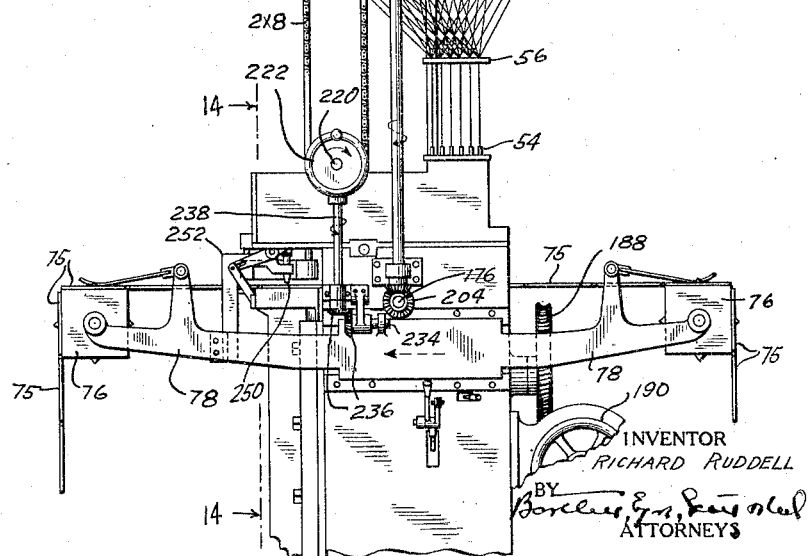
INVENTOR
RICHARD RUDDELL
BY
ATTORNEYS

INVENTOR
RICHARD RUDDELL
BY
ATTORNEYS

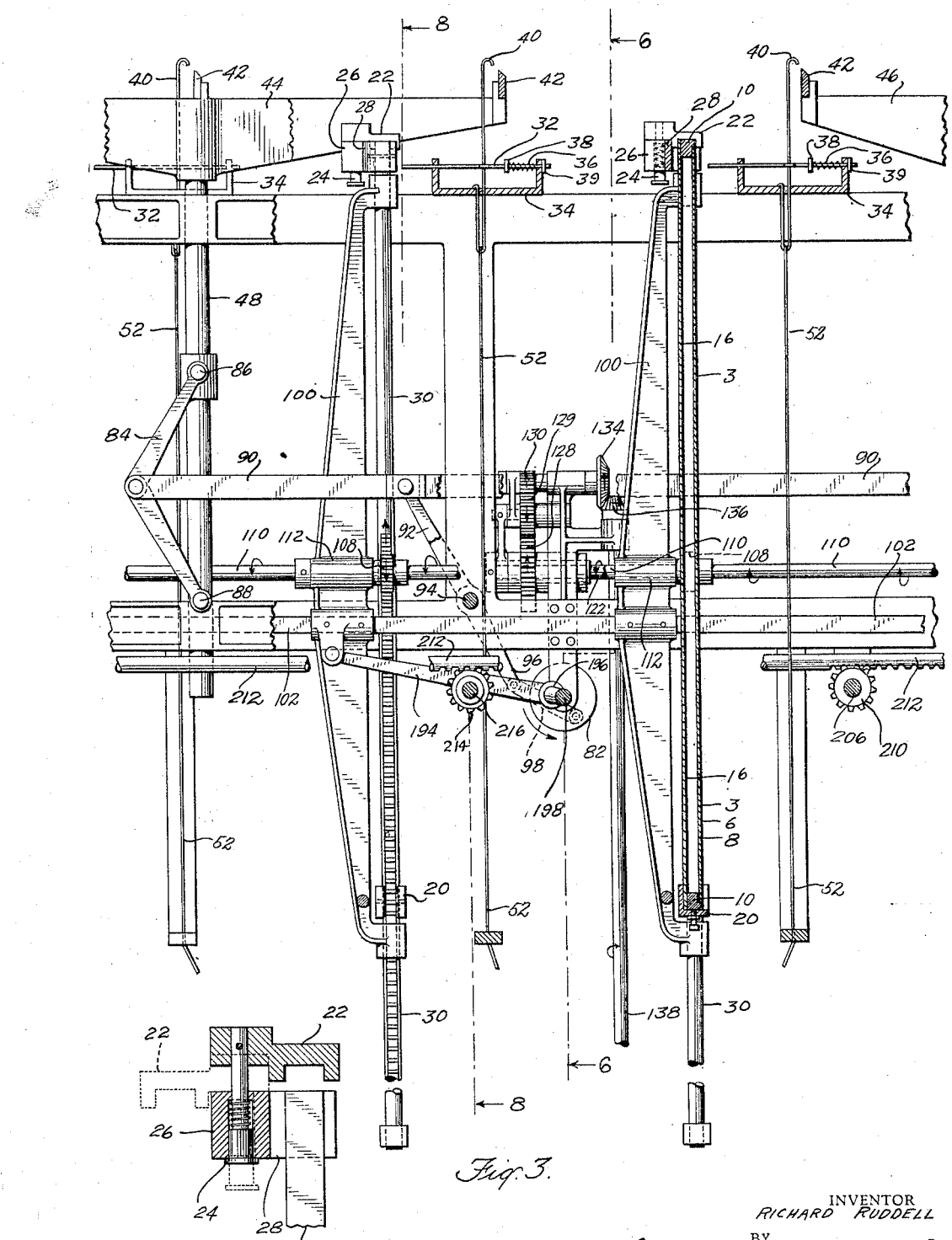

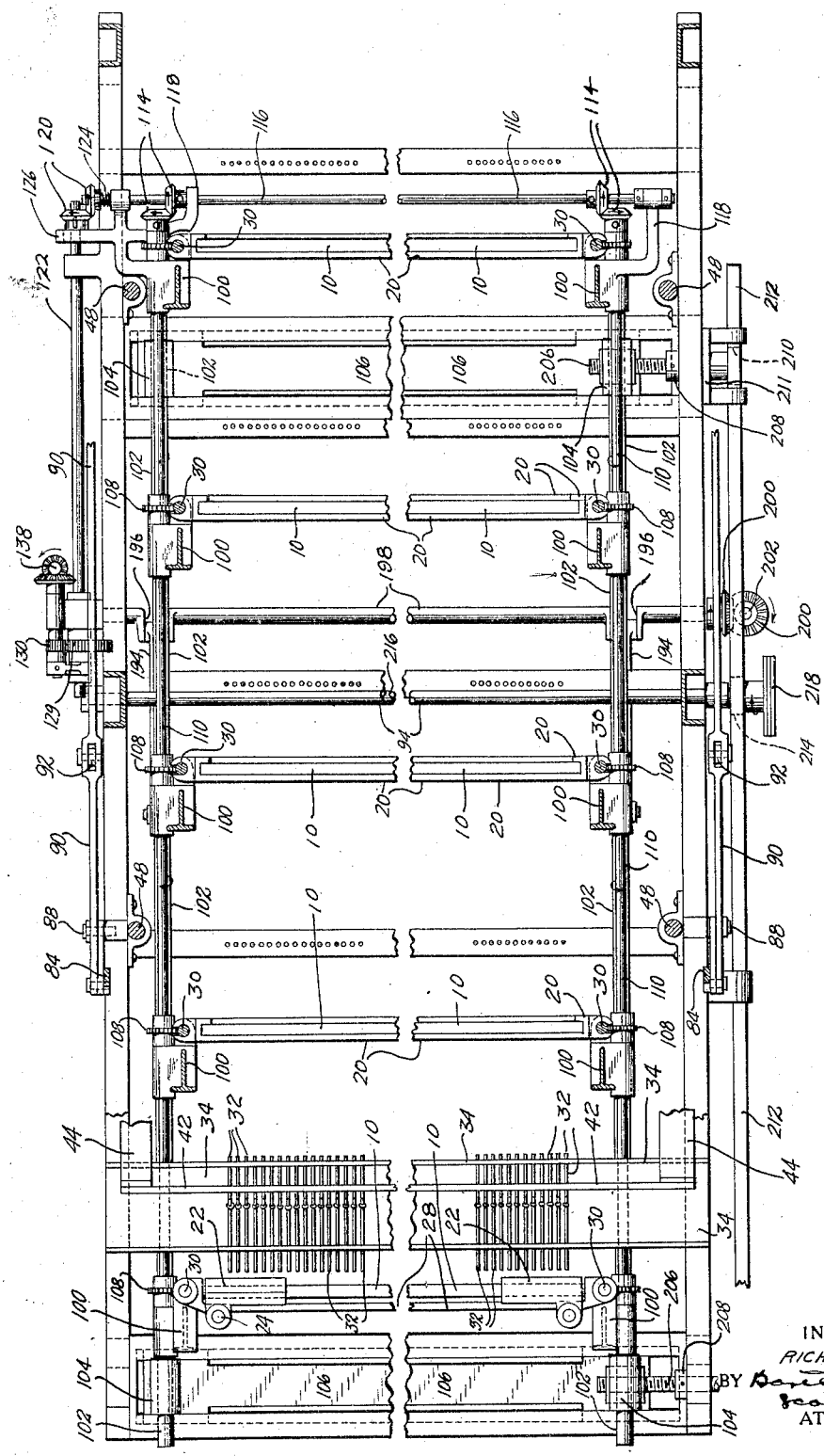

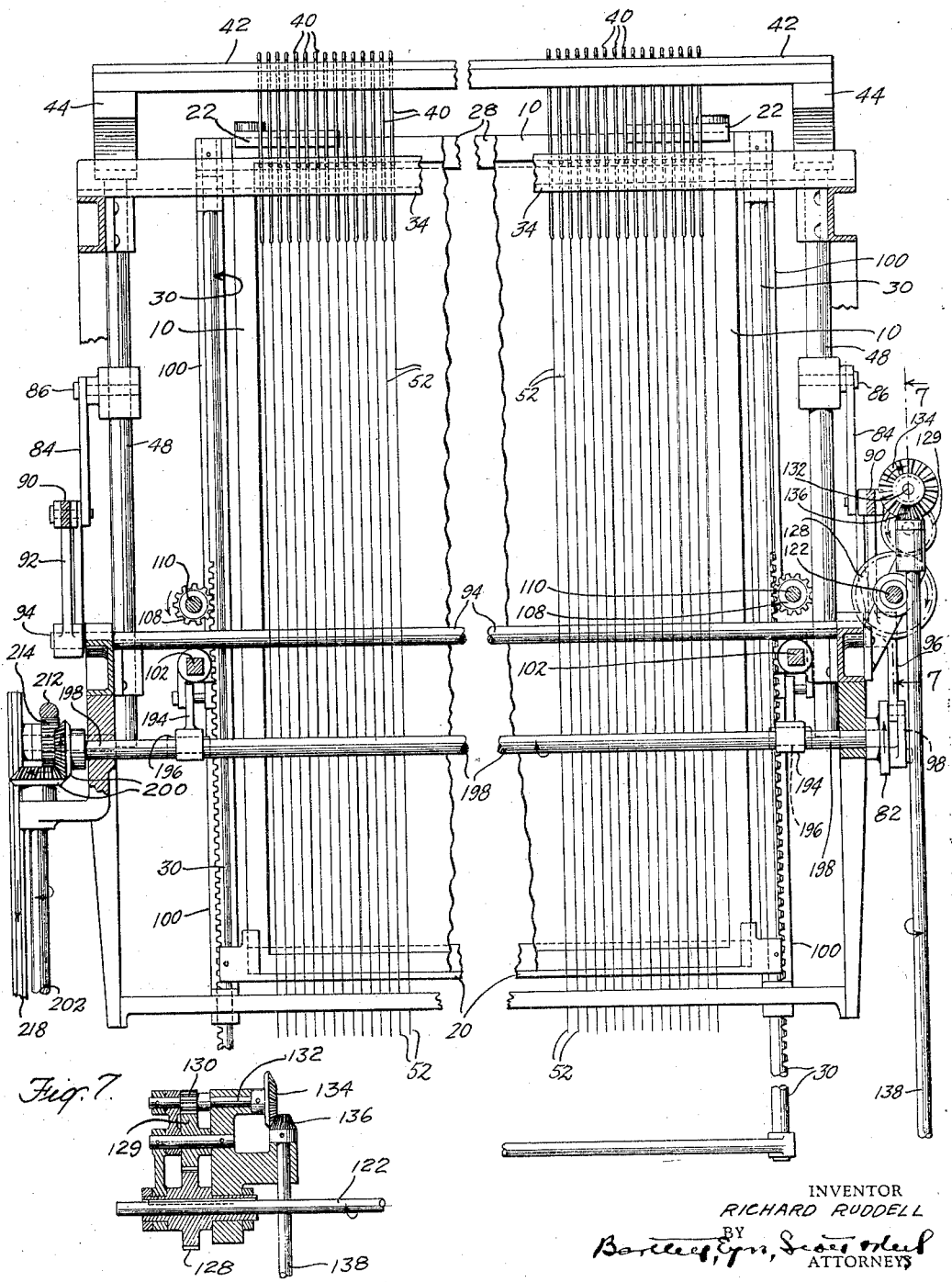

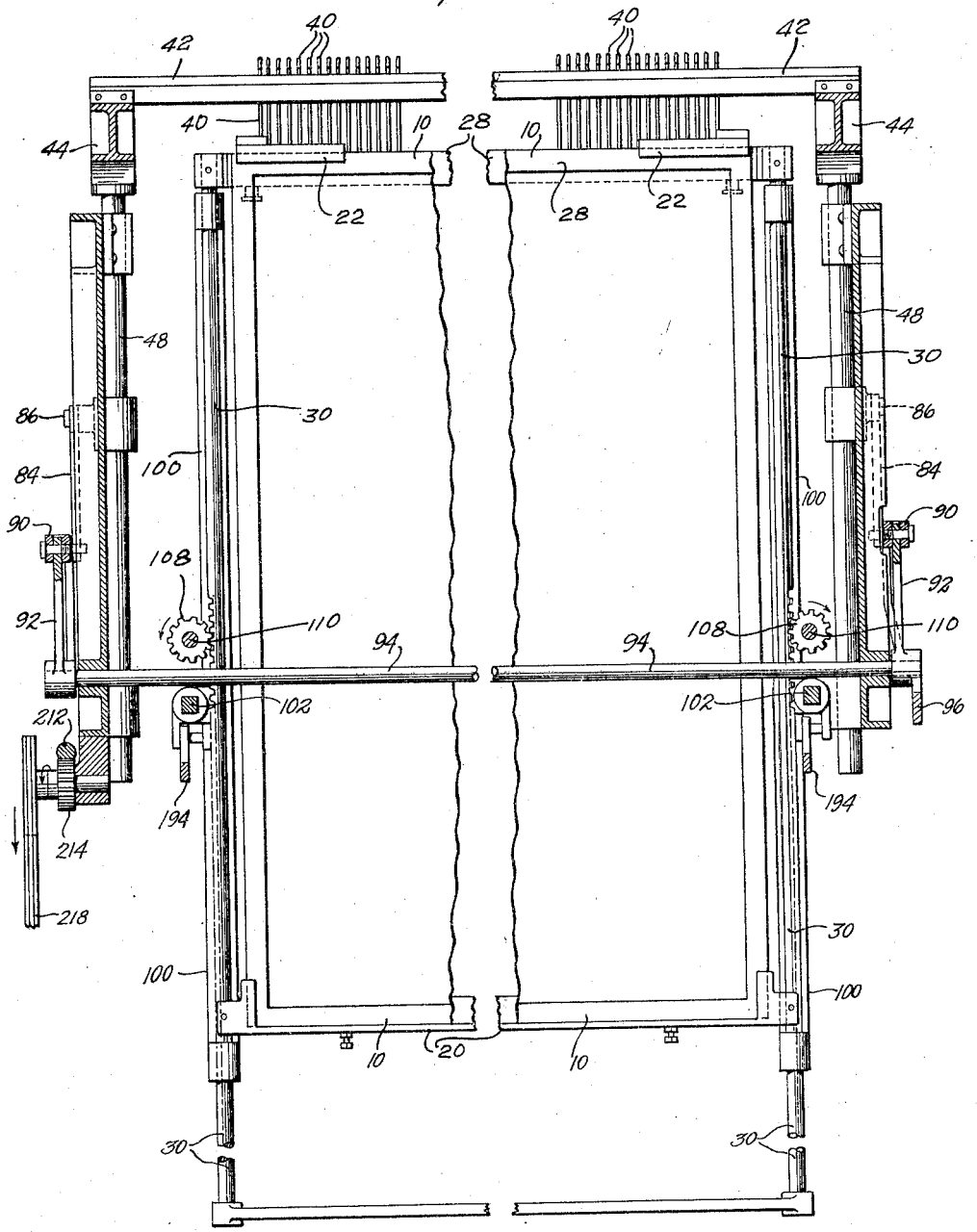

June 13, 1933. R. RUDDELL 1,913,514
MACHINE FOR AND METHOD OF PERFORATING JACQUARD CARDS
Filed Aug. 23, 1929 14 Sheets-Sheet 7
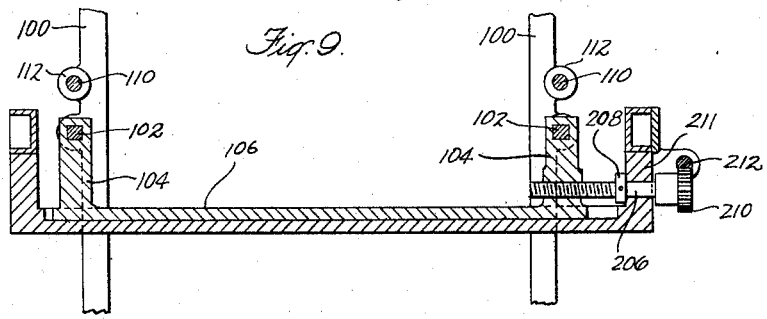
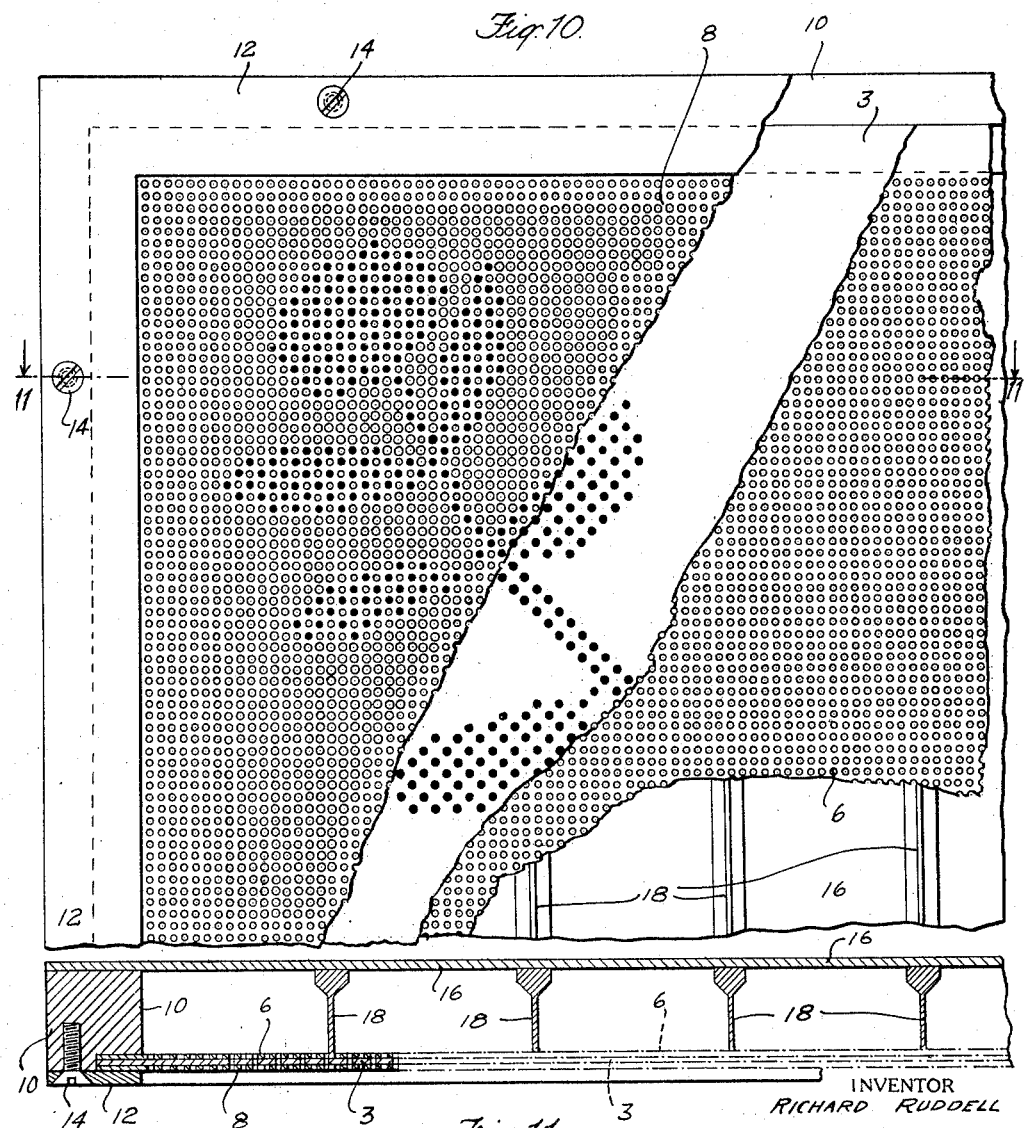
INVENTOR
RICHARD RUDDELL
ATTORNEYS June 13, 1933.  R. RUDDELL  1,913,514
MACHINE FOR AND METHOD OF PERFORATING JACQUARD CARDS
Filed Aug. 23, 1929  14 Sheets-Sheet 8
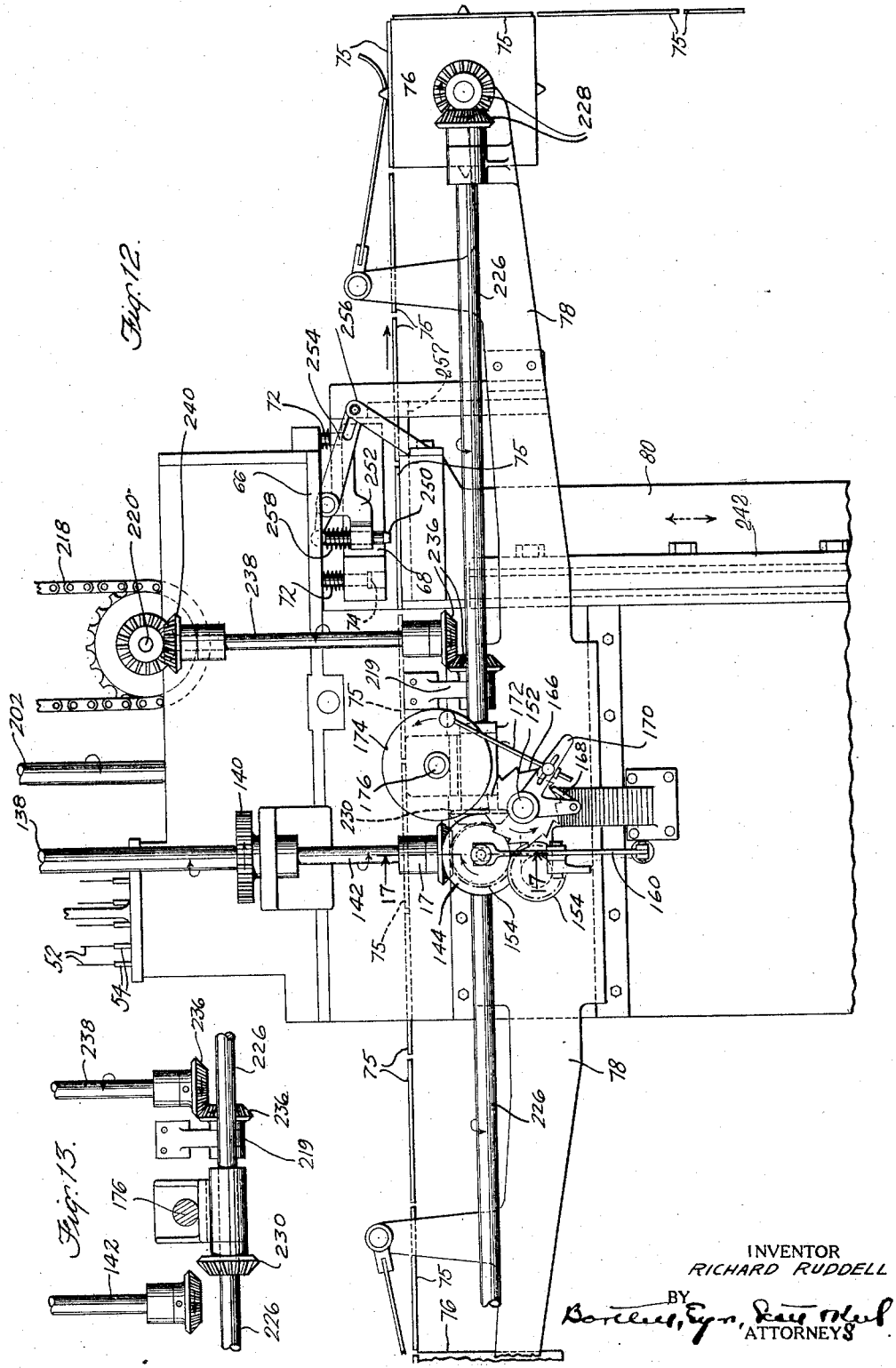
INVENTOR
RICHARD RUDDELL
BY
ATTORNEYS

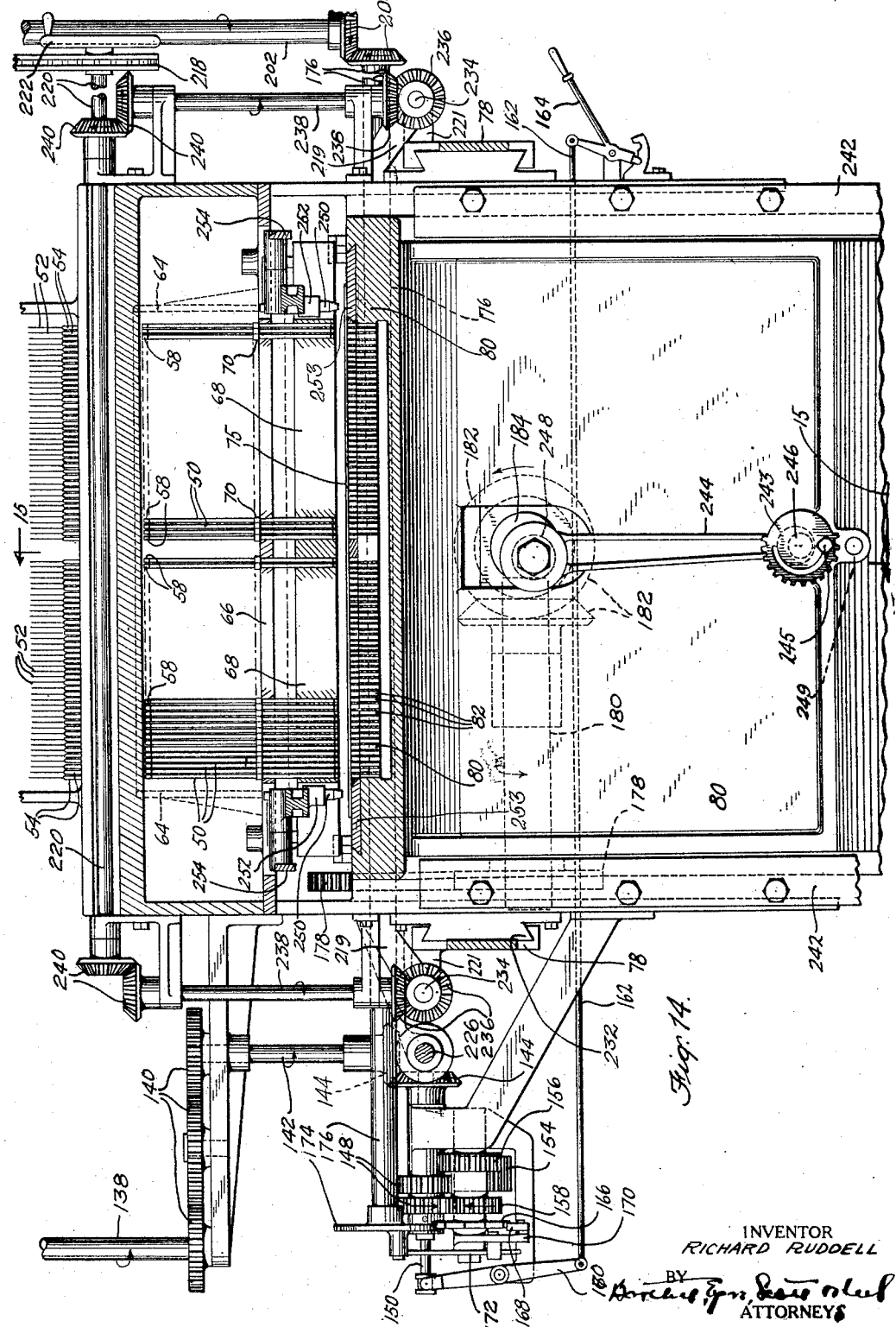

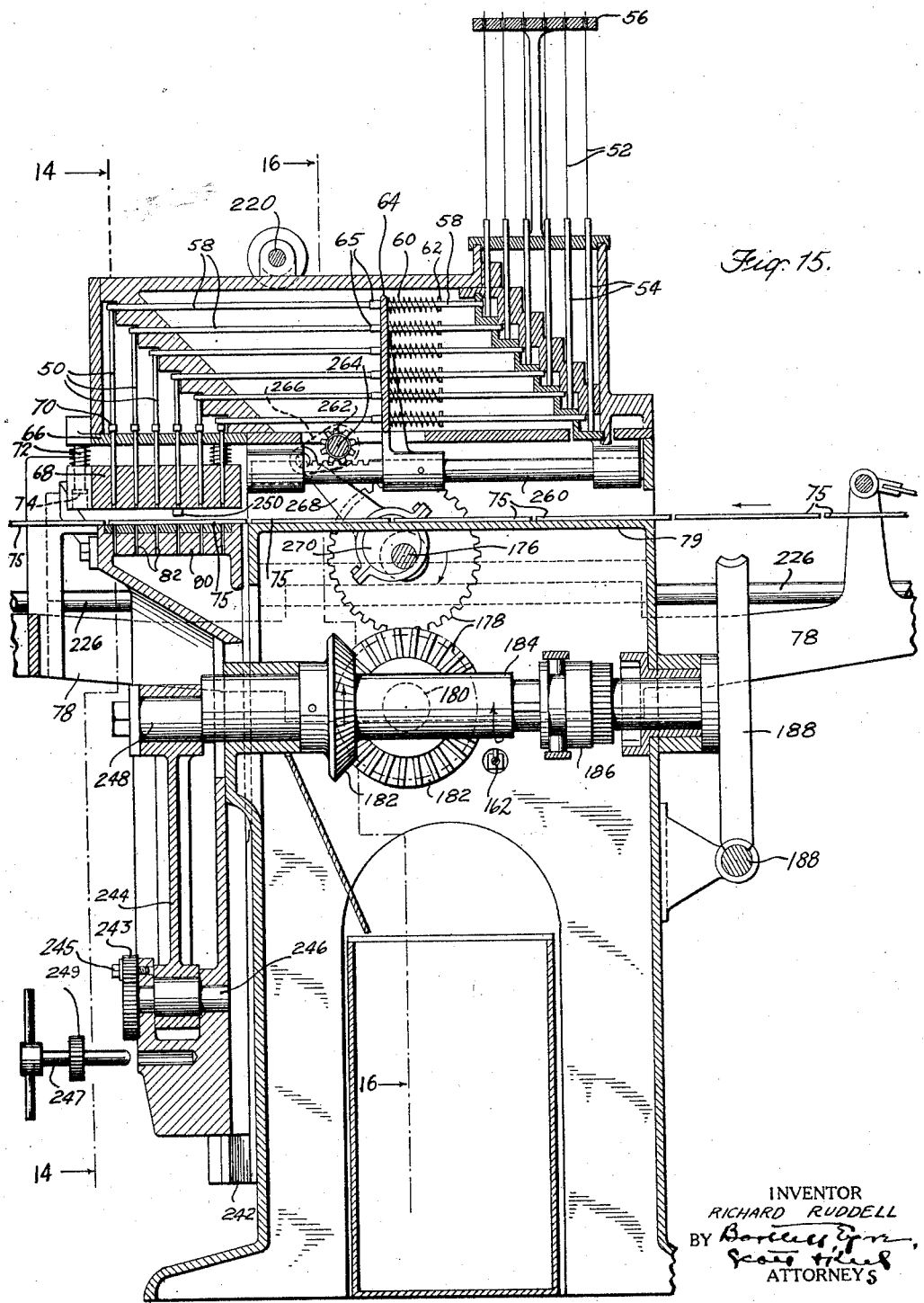

June 13, 1933.   R. RUDDELL   1,913,514
MACHINE FOR AND METHOD OF PERFORATING JACQUARD CARDS
Filed Aug. 23, 1929   14 Sheets-Sheet 11
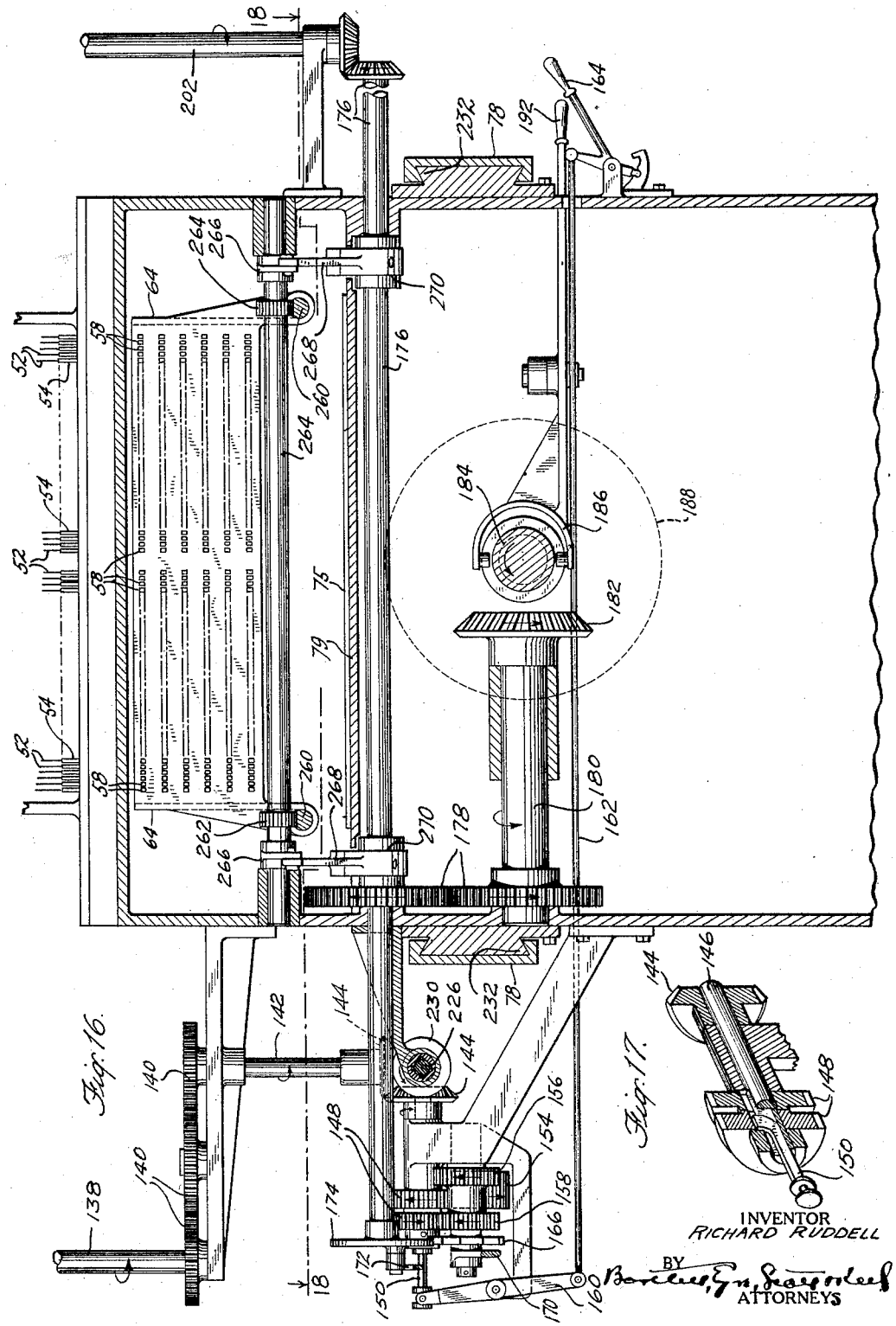
INVENTOR
RICHARD RUDDELL
ATTORNEYS

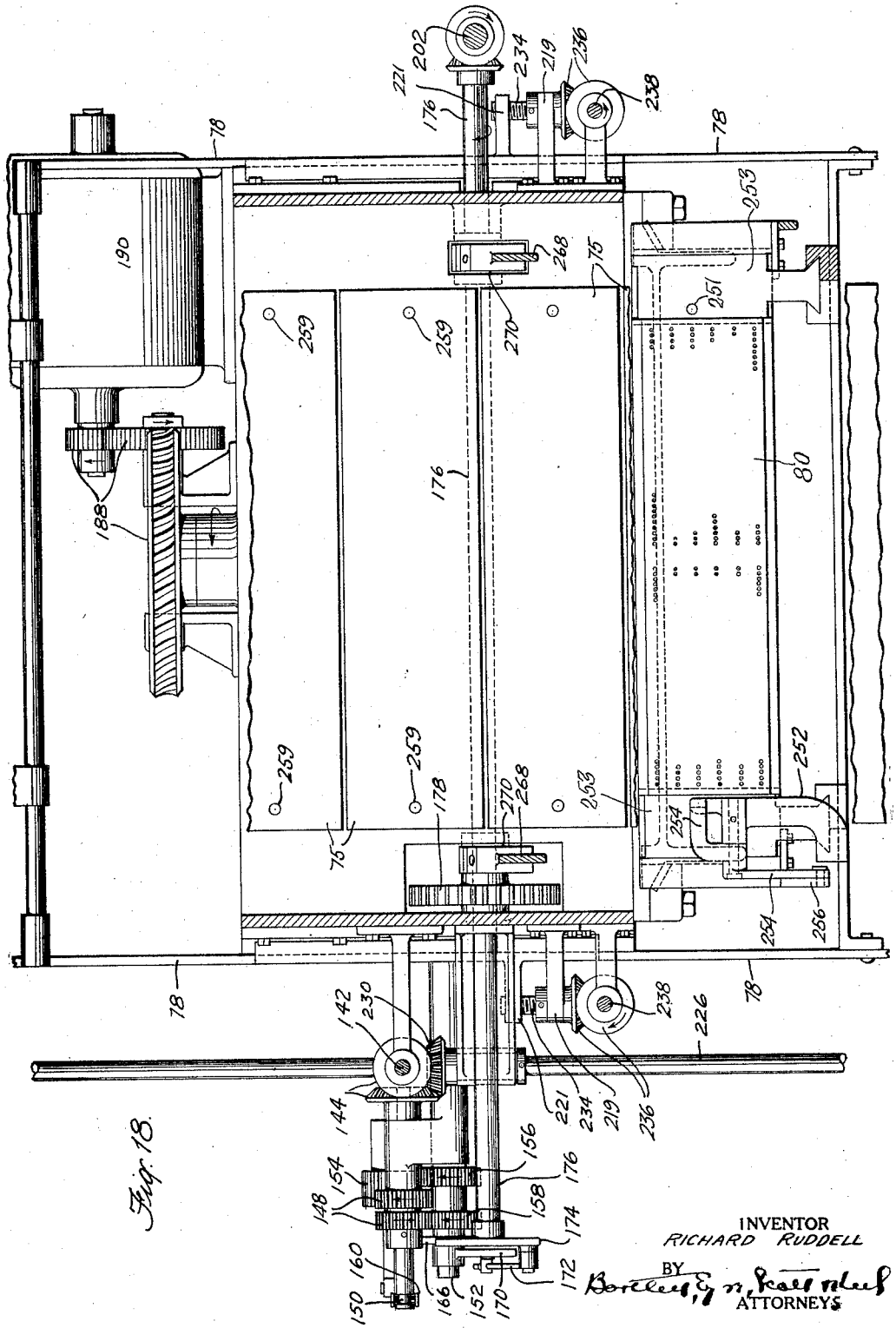

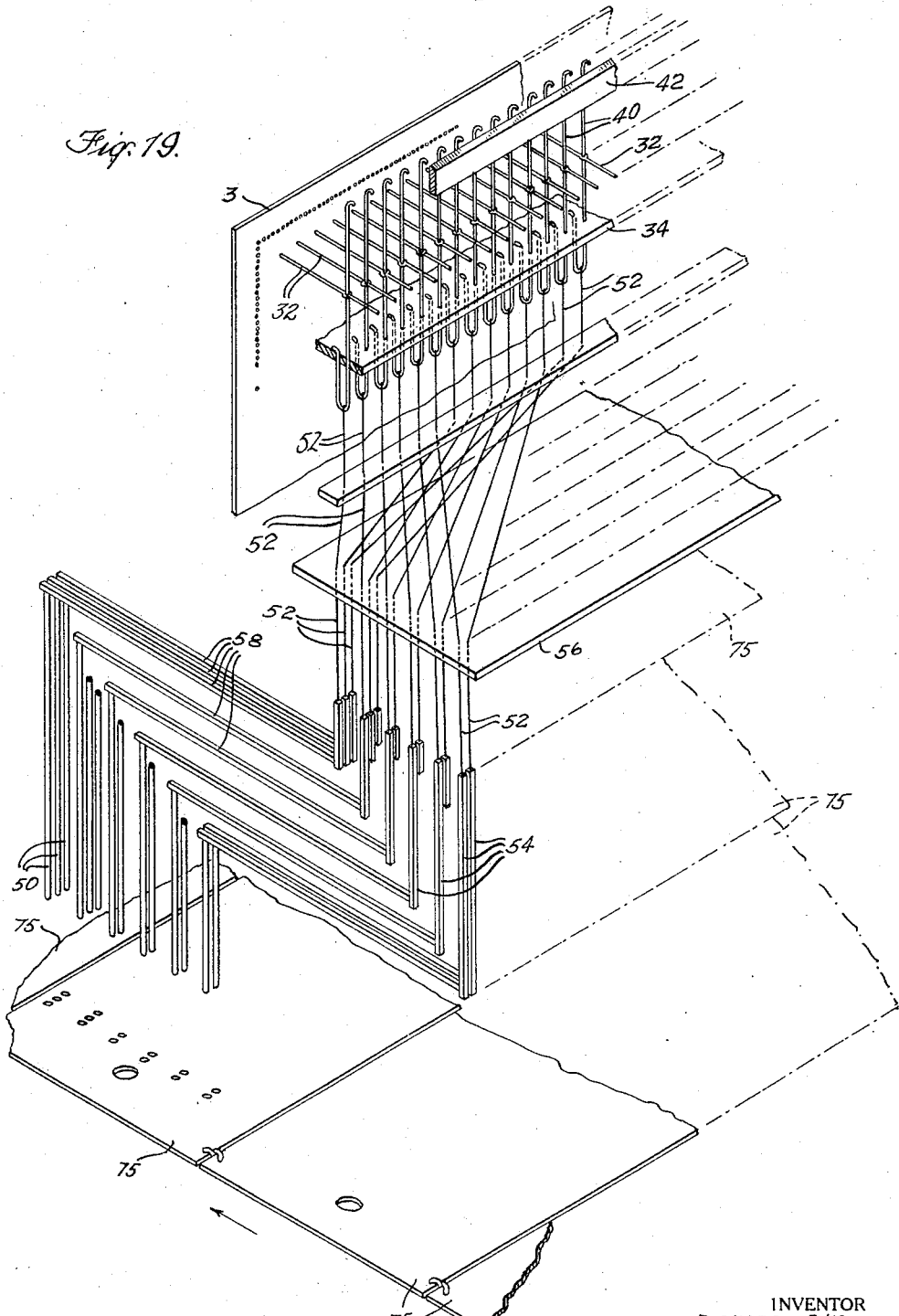

June 13, 1933. R. RUDDELL 1,913,514
MACHINE FOR AND METHOD OF PERFORATING JACQUARD CARDS
Filed Aug. 23, 1929 14 Sheets-Sheet 14

INVENTOR
RICHARD RUDDELL
BY
ATTORNEYS

Patented June 13, 1933

1,913,514

UNITED STATES PATENT OFFICE

RICHARD RUDDELL, OF SOUTH MANCHESTER, CONNECTICUT, ASSIGNOR TO CHENEY BROTHERS, OF SOUTH MANCHESTER, CONNECTICUT, A CORPORATION OF CONNECTICUT

MACHINE FOR AND METHOD OF PERFORATING JACQUARD CARDS

Application filed August 23, 1929. Serial No. 387,885.

My invention relates to machines for and methods of perforating jacquard cards.

One of the objects of my invention is to provide a novel and improved machine and method of this character.

Another object of the invention is to provide a machine of the character indicated which is accurate and expeditious in operation and capable of turning out a wide range of work.

A further object of the invention is to provide a machine of this character which is so controlled automatically during the operation thereof that highly skilled operators are not required even in the production of the finest and most exacting work.

These and other objects of my invention and features whereby they may be attained will be readily understood from the following description and accompanying drawings, in which:

Figure 1 is a front view of a portion of a jacquard card perforating machine embodying the features of my invention in their preferred form;

Fig. 3 is a detail view on an enlarged scale and partly in section of a portion of the machine shown in Figs. 1 and 2;

Fig. 4 is a detail sectional view of a screen frame holding device hereinafter described;

Fig. 5 is a sectional plan view taken on the line 5—5 of Fig. 2;

Fig. 6 is a sectional view taken on the line 6—6 of Fig. 3;

Fig. 7 is a detail sectional view taken on the line 7—7 of Fig. 6;

Fig. 8 is a sectional view taken on the line 8—8 of Fig. 3;

Fig. 9 is a sectional view taken on the line 9—9 of Fig. 2;

Fig. 10 is a detail face view of a portion of one of the screen frames hereinafter described;

Fig. 11 is a sectional view taken on the line 11—11 of Fig. 10;

Fig. 12 is a rear view of the lower or card perforating part of the machine, partly broken away to save space;

Fig. 13 is a detail rear view, partly in section, of a portion of certain driving devices shown in Fig. 12;

Fig. 14 is a sectional view taken on the line 14—14 of Figs. 1 and 15;

Fig. 15 is a sectional view taken on the line 15—15 of Fig. 14;

Fig. 16 is a sectional view taken on the line 16—16 of Fig. 15;

Fig. 17 is a detail sectional view, in perspective, of a portion of a reversing mechanism, the section being taken substantially on the line 17—17 of Fig. 12;

Fig. 18 is a sectional plan view taken on the line 18—18 of Fig. 16;

Fig. 19 is a diagrammatical view in perspective, illustrating especially the connection between the head motion and the card perforating punches of the machine;

Figure 22:
Figs. 22, 23, 24 and 25 are bottom views of punching devices which may be employed in punching out or perforating the design on the sketch paper.
Figure 23:
Figure 24:
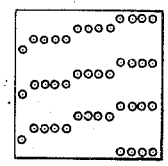
Figure 25:
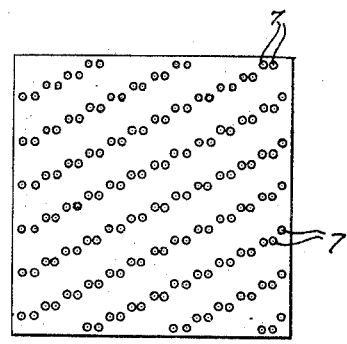
Figure 21:
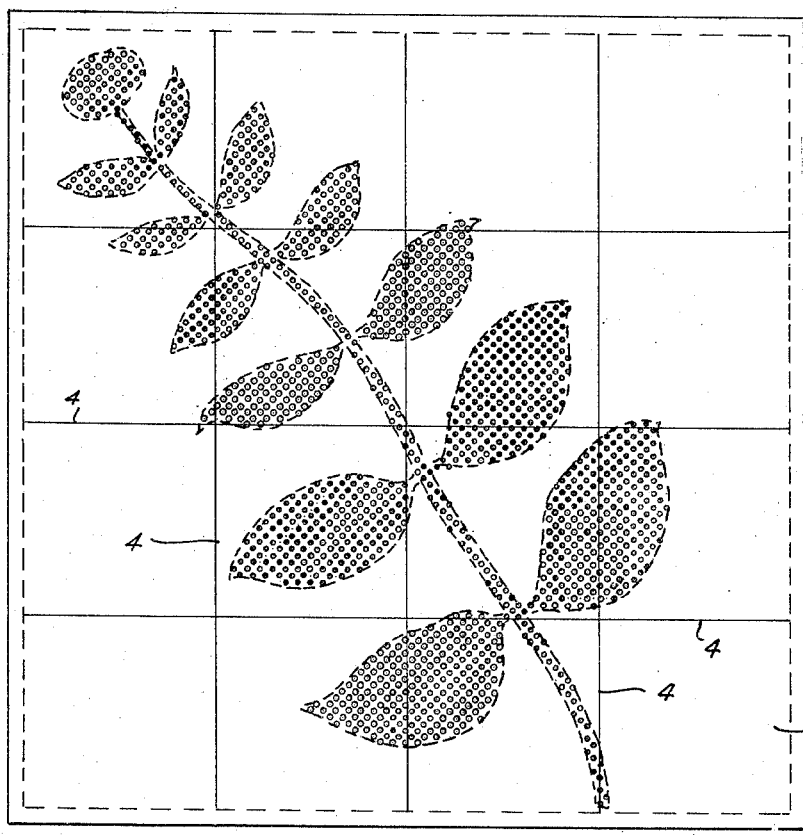
Fig. 21 is a view of a sketch paper on which the design is shown enlarged approximately eight times, and perforated ready for use in the machine.
Figure 20:
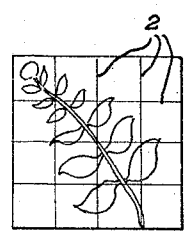
Fig. 20 is a view of a typical design which may be transposed by the machine.

In accordance with the present invention, the design to be transposed such as the one indicated in Fig. 20, which may be four inches square, is cross-hatched into sixteen squares by lines 2. This design is then placed in an enlargement camera (not shown) of a common construction on the projection table of which is placed a sketch paper 3, 32 x 32 inches inside the margin, which is also cross-hatched into sixteen squares by lines 4. Since the camera enlargement is eight times, the cross-hatching on the design and sketch paper coincide. The sketch paper can be moved about to obtain the best focus, still keeping the lines in coordination, and the design may be transferred by tracing with a lead pencil. The sketch paper is then placed upon a metal screen 6 which may contain one hundred forty-four holes to the square inch of .05 inch in diameter, and is held smoothly in place by vacuum or other suitable means. A screen (not shown) of celluloid or other transparent material having holes punched therein in accordance with the series of punchings desired, is now placed on the sketch and the paper perforated by a series of hand-tools constructed with punches of said series, the punches made in the sketch paper alining with the perforations in the screen. Said celluloid screen may be of small area, as 8 x 8 inches, or it may cover the entire sketch. To expedite this punching the hand-tools may consist of four tools that are one-quarter inch, one-half inch, one inch, and two inches square, with the punch points 7 arranged in the desired series as indicated in Figs. 21, 22 and 23. Thus, for large block work two square inches of paper may be punched out with one action. Surfaces smaller than one-quarter inch may be punched with single pointed tools.

Where the design is made of several different colors, a separate sketch paper is punched for each color. Also, in case the design is of large area, such as eighty square inches, the enlarged design on the sketch paper after being traced, is divided into a plurality of parts so that each part of the design appears on separate sheets.

After the design or parts of the design have thus been punched out, a second metal screen 8 provided with perforations arranged the same as the first, is placed over each punched out sketch paper, and each sketch paper together with the screens are placed in the head motion of the design transferring machine.

During the operation of the machine, where five sketches or patterns are employed, as above described, there will be five groups of punchings on each jacquard card, each group being transposed from the punchings in each sketch and the several groups being arranged side by side.

Previously to placing each sketch paper and its screens 6 and 8 in the head motion of the transferring machine, they are set into a skeleton frame 10 (Figs. 10 and 11) and securely held in place by an outer frame member 12 detachably secured to the frame by screws 14. The back of the frame is closed by a cover plate 16 spaced a distance back of the inner screen 6, and the screens are braced by vertical strips 18 having their rear edges secured to said cover plate and their forward edges bearing against the inner screen, the forward edge portions of these strips being sufficiently thin so as to engage the inner screen between vertical rows of perforations.

Figure 2:
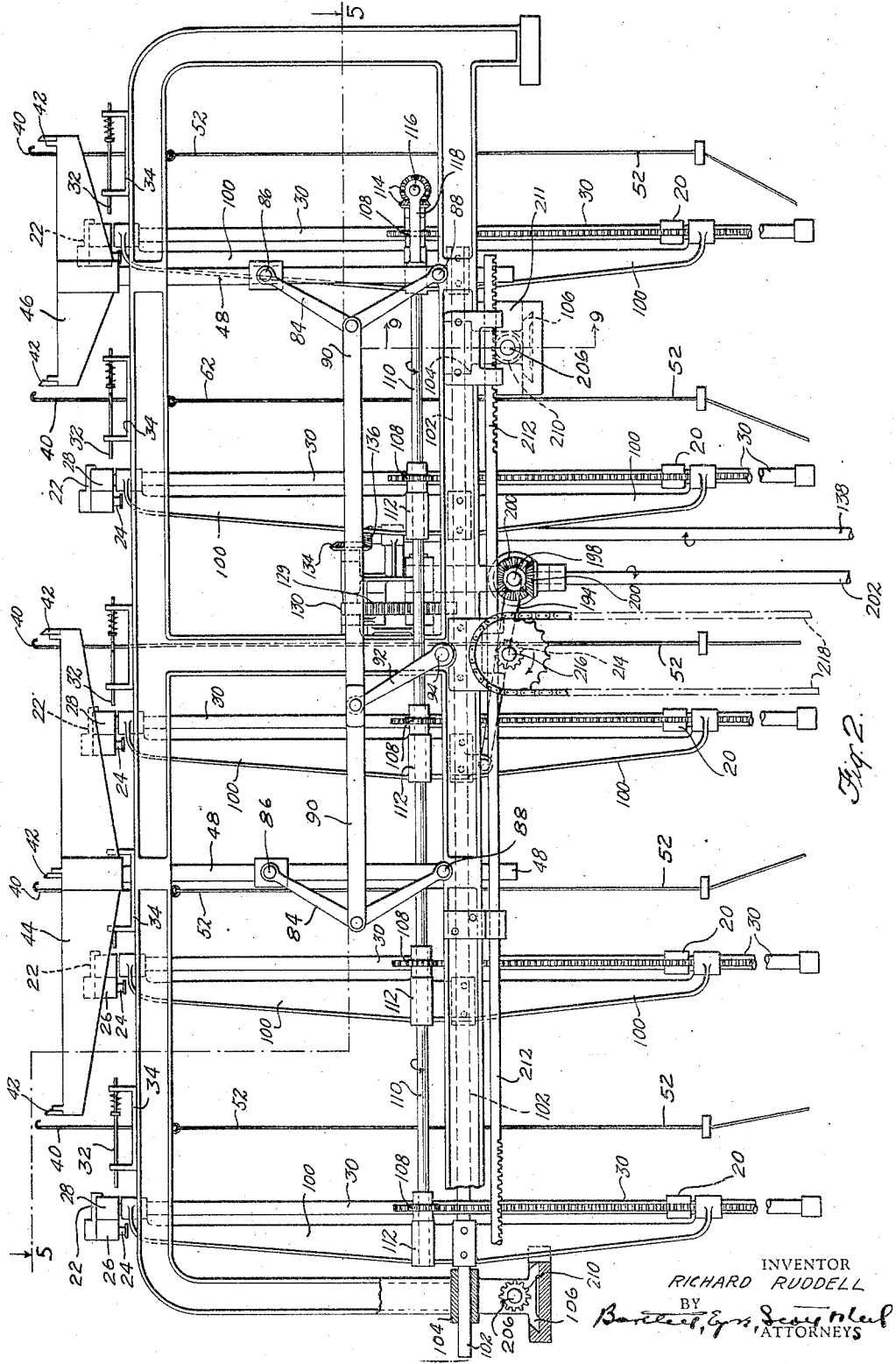
Fig. 2 is a view corresponding to the upper portion of Fig. 1 but on an enlarged scale and showing certain parts in section.

Each double screen, sketch and frame is mounted in vertical position in the machine, the several frames being spaced apart (Figs. 1, 2 and 3). The mounting for each frame comprises a grooved cross-bar 20 (Fig. 8) upon which the lower edge of the frame rests and is held, and grooved clamping members 22 (Fig. 4) which engage the upper edge of the frame adjacent its ends. These clamping members 22 are secured on downwardly spring pressed pins 24 which are pivotally mounted in bosses 26 on a cross-bar 28 so as to permit said members to be pulled upwardly against the tension of their springs and swung out of the way to allow for insertion and removal of the screen frames. Each set of cross-bars 20 and 28 are secured at their ends to vertical rods 30.

Associated with each double screen and frame is a row of selecting needles 32 (Figs. 3 and 19) horizontally mounted in a channel iron support 34 secured to the machine frame. These needles are individually pressed toward the screen by a spring 36 coiled about the needle and engaging a collar 38 secured on the needle, the advancing movement of the needle being limited by a collar 39 secured on the outer end thereof and engaging the support 34.

Each selecting needle 32 of each row controls a griff wire 40, and the several griff wires associated with each row of selecting needles 32 has associated therewith a griff bar 42. The first three griff bars 42, viewing Fig. 2, are carried by a common griff frame 44 and the other two griff bars are carried by a common frame 46. The griff frames 44 and 46 are respectively secured on the upper ends of vertical rods 48 mounted to slide in suitable bearings in the machine frame.

The griff wires 40 individually control a bank of punches 50 (Figs. 14, 15 and 19) in the base of the machine. The connection between each griff wire and its punch 50 comprises a string 52 which has one end connected to the griff wire and its other end connected to a vertical finding pin 54. The strings 52 connected with all the griff wires pass through perforations in a collector plate 56 which is suitably supported on the frame of the machine, this collector plate guiding the strings vertically to the finding pins 54. Each finding pin 54 has associated therewith, an interfering pin 58 horizontally arranged and pressed toward the lower end portion of the finding pin by a spring 60 coiled about the interfering pin and interposed between a collar 62 secured thereon and a re-setting plate 64 through which all of the interfering pins extend, stop collars 65 on the interfering pins abutting against the back of said re-setting plate. The outer end of each interfering pin 58 is adapted to be positioned adjacent the upper end of each punch rod 50 so as to provide a stop for the rod. The several punch rods 50 are mounted to slide through apertures in a plate 66 secured to the machine frame, and also in apertures in a block 68, the downward movement of the punches being limited by collars 70 secured thereon engaging the top side of the fixed guide plate 66. The block 68 is mounted on depending pins 72 secured to the plate 66, and the block is pressed downwardly by springs coiled about the pins 72 and interposed between the plate 66 and the block 68, downward movement of the block being limited by a flange 74 on the lower end of each pin 72.

The chain of jacquard card blanks 75 to be perforated pass over card cylinders 76 mounted between the ends of side frames 78, and the upper stretch of the card chain extending between the cylinders rides over a supporting table 79 and a reciprocating punch block 80 which is provided with apertures 82 for receiving the lower ends of the punches and through which the waste punchings from the jacquard cards are discharged.

It will be apparent that when a selecting needle 32 is pushed back when no perforation appears in the sketch paper, the upper hooked end of the griff wire 40 associated therewith is positioned over the associated griff board 42 so that upon the next upward movement of the griff, the griff wire is pulled upwardly and through the string 52 raises the finding pin 54 connected therewith out of engagement with the associated interfering pin 58, allowing the spring of the interfering pin to carry the outer end thereof out of interfering engagement with the associated punch rod 50. In case a selecting needle 32 enters a perforation in the sketch paper the hooked end of the griff wire 40 remains out of position to be engaged by the griff and, therefore, the associated interfering pin 58 remains in interfering engagement with its associated punch rod. When the punch block 80 is raised to punch a card, the punches that are held by the interfering pins 58 serve to perforate the card, while the other punches are free to be pushed upwardly by the card. As the punched block 80 retracts, the block 68 serves to strip the punched card from the punches.

As above indicated in the construction shown, each horizontal line of perforations in each double screen consists of three hundred and eighty-four perforations. Each row of selecting needles 32, however, may have but ninety-six needles, and these needles are equally spaced apart. Consequently when the machine is ready to start operating numbers 1, 2, 3, 4, and 5, etc., needles line up with 1, 5, 9, 13 and 17, etc., perforations in the first horizontal line of perforations in the screens. After the first line of perforations in the screen has thus been presented to the selecting needles and the screen is retracted, the screen is raised to present the next horizontal line of perforations to the selecting needles, and the chain of cards is advanced to present the second card of the pack to the bank of punches. In a similar manner the remaining horizontal lines of perforations in the screen are presented to the selecting needles and the cards successively punched. At the completion of this operation whereby each screen frame is intermittently raised to successively present the several horizontal lines of perforations to the selecting needles, each screen frame is shifted sidewise a distance corresponding to the distance between the centers of adjacent perforations in the screen so as to present the second, sixth, tenth, fourteenth, and eighteenth, etc., perforations in the lowermost horizontal line of perforations to the selecting needles. Also, the upper stretch of the chain of cards is shifted longitudinally so as to present to the punches different points on the first card to be subsequently punched which is the last card that had been punched in the previous cycle of operation. When these adjustments have been made, the machine is again thrown into operation so as to cause each screen frame to be moved toward and from the selecting needles so as to cause the perforations appearing in alinement with the lowermost line of perforations in the associated screen to be transposed to the first card to again be punched. Each double screen is then lowered so as to present the second lowermost line of perforations to the selecting needles and the chain of cards is moved in a reverse direction to its movement during the first cycle of operation of the machine, to present the next card to the punches. In a similar manner the remaining horizontal lines of perforations in each screen are successively presented to the selecting needles and the cards intermittently fed to cause them to be successively punched.

When all of the cards have again been punched during the lowering of the screens, each screen frame is then shifted edgewise to aline numbers 3, 7, 11, 15, 19, etc., perforations in the uppermost line of perforations in the screen with the selecting needles. Also, the upper stretch of the chain of cards is shifted longitudinally to present other points on the first card to be again punched to the punches. When these adjustments have been made the several screens are moved toward and from the associated selecting needles so as to control the punches to perforate the first card in its new position. The screen is then raised intermittently to successively present the remaining lines of perforations to the selecting needles, and the cards are intermittently fed so as to be successively punched as above described.

At the completion of this cycle of operation, the screens are shifted edgewise to aline the perforations 4, 8, 12, 16, 20, etc., in the lowermost line in the several screens with the associated selecting needles, and the upper stretch of the cards is shifted to the proper position to present different points to the punches. The several screens are then intermittently lowered to successively present the horizontal lines of perforations to the selecting needles and the cards are fed in the opposite direction to successively present them to the punches.

When these operations have been completed it will be apparent that all the cards have been punched in accordance with the perforations in the sketch papers, and that the completely punched chain of cards is ready for use in a Jacquard loom, engraving, or similar machine.

In the illustrated construction each bank or group of selecting needles, consisting of ninety-six needles, is connected with a bank of punches, each bank consisting of ninety-six punches. The punches in each bank are arranged in rows of six extending lengthwise and rows of sixteen extending crosswise of the upper stretch of the card chain. The five banks of punches associated with the five sets of screens are arranged side by side. The first six selecting needles of each group are respectively connected with the punches of the first lengthwise row of the associated bank of punches, and the next six needles are connected with the punches of the next such row of the bank and so on as indicated diagrammatically in Fig. 19. With this arrangement of punches, when the machine is operated as above described with all five screen frames in operation, each card of the card chain may be perforated with the perforations appearing in groups arranged side by side, each group of perforations being transposed from the sketch of the associated screen frame.

From the foregoing it will be apparent, in accordance with my improved method and machine that in case the design is of a single color and is approximately four inches square for example, it is only necessary to utilize but one screen frame and sketch. If the design is of more than one color a separate frame and sketch would be employed for each color, the machine illustrated in the drawings being capable of at least five color work. Also, in case the design is of large area such as eighty square inches there is a screen frame for each division, the design being divided up into a plurality of parts as above described.

It will be apparent that the illustrated machine is a marked improvement over the usual piano-key card cutting machine which requires skilled operators, and is difficult laborious work to operate and is very exacting for the reason that if a mistake is made in making a single punch the card is spoiled. Also, with the use of my improved machine the several colors in a design are so transposed as to ensure proper matching of the colors when the cards are used in Jacquard looms and other machines. Also, where the machine is used to perforate cards for a large design, such as eighty square inches, proper matching up of the different parts of the design is assured.

In the illustrated machine, the two griff frames 44 and 46 are raised and lowered to lift the griff wires through connection with a crank disk 82, Fig. 3. The connection between the several griffs and the crank disk 82 comprises toggles 84, there being a toggle associated with both rods 48 of each griff. The upper arm of each toggle has its upper end pivotally connected at 86 with the griff rod 48 and the lower arm has its lower end pivotally connected at 88 on a fixed part of the machine frame. The inner ends of the arms of both the front and rear toggles are respectively connected by an actuating rod 90. Each rod 90 is operated by an oscillating arm 92 having its free end pivotally connected with the rod 90 and its other end secured on a rock shaft 94. This rock shaft 94 is actuated through an arm 96 secured on the rear end thereof, and the free end of this arm is connected by a link 98 with the crank disk 82.

The vertical rods 30 for supporting each screen frame are each mounted to slide in bearings on the ends of a carrier yoke 100. The series of yokes 100 on the front and rear of the machine are respectively secured on square rods 102 which have their ends mounted to slide in bearings in brackets 104 on slides 106 (Figs. 2 and 5) which are mounted on suitable supports on the machine.

The screen frames are raised and lowered to aline different lines of perforations with the selecting needles as above described, by pinions 108 (Figs. 3 and 8) which operatively engage rack teeth on the vertical carrier rods 30. The two series of pinions 108 associated with the front and rear rack rods 30 are respectively carried by horizontal shafts 110 which are journaled in bearings 112 on the carrier yokes 100. The right hand ends of these pinion shafts 110 (Fig. 5) are driven through beveled gears 114 by a transverse shaft 116 journaled in bearings in bracket arms 118 projecting from the right endmost carrier yoke 100. This shaft 116 is driven through beveled gears 120 by a shaft 122 journaled in bearings on the rear side of the machine frame. The beveled gear 120 on the shaft 116 is splined on the shaft and is maintained in operative engagement with the other beveled gear 120 by a spring 124 coiled about the shaft. This other beveled gear 120 is splined on the shaft 122 and is held from retracting movement from its cooperating gear by an arm 126 projecting from the right endmost carrier yoke 100, said arm being provided with a clearance slot through which the shaft extends. Such provision for maintaining the gears 120 in operative engagement allows for movement of the screen frames toward and from the selecting needles, and edgewise shifting of the screen frames as above described.

The shaft 122 is driven by a gear 128 secured thereon (Figs. 6 and 7) which through an idler 129 is driven by a pinion 130 carried by a short shaft 132. This shaft 132 has a beveled gear 134 secured on one end thereof which is operatively engaged by a pinion 136 carried on the upper end of a vertical shaft 138. The shaft 138 is driven through spur gears 140 (Figs. 12 and 16) by a shaft 142 which is driven through beveled gears 144 by a shaft 146 (Fig. 17). The shaft 146 is driven intermittently, and the mechanism for driving the shaft is adapted to be controlled by the operator to reverse the direction of the intermittent movement thereof. This reversing mechanism comprises two gears 148 mounted on the shaft 146 and adapted to be separately connected with and disconnected from the shaft by means of a manually operable sliding key 150. The gears 148 are driven from an intermittently driven shaft 152. One of the gears 148 is connected with the shaft 152 through an idler gear 154 and a gear 156 secured on the shaft 152, and the other gear 148 is operatively engaged by a gear 158 secured on the shaft 152. With this construction, by means of the shiftable key 150 the direction of the intermittent rotation of the shaft 146 may be changed so as to reverse the vertical movement of the screen frames as above described. The key 150 may be conveniently shifted from the front of the machine through a lever 160, the upper end of which is bifurcated so as to engage in an annular groove in the outer end of the key 150 and the lower end of which is connected by a link or rod 162 with a hand-operated lever 164 conveniently located at the front of the machine.

The mechanism for driving the intermittently driven shaft 152 comprises a ratchet wheel 166 secured on the shaft which is engaged by an operating pawl 168 carried by a carrier lever 170 which is operatively connected by a link 172 with a crank disk 174 secured on a shaft 176 which is driven through spur gears 178 by a shaft 180 (Fig. 16). The shaft 180 is driven through beveled gears 182 by a shaft 184 which through a manually controllable clutch 186 is driven by a suitable chain of gearing 188 from the shaft of an electric motor 190 (Fig. 18).

The clutch 186 through which the entire machine may be thrown into and out of operation, is conveniently controlled from the front of the machine by means of a hand-operable lever 192.

The screen frames are moved toward and from the selecting needles as above described by means of links or rods 194 (Fig. 3) having corresponding ends pivotally connected, respectively, with the yokes 100 associated with one of the screen frames, and their other ends pivotally connected with cranks 196 (Fig. 5) formed on a transverse shaft 198 which also carries the crank disk 82 for operating the griffs, the screen frames all moving together through being secured on the sliding square rods 102. The crank shaft 198 is driven through beveled gears 200 (Fig. 1 and 6), vertical shaft 202 and beveled gears 204, by the horizontal drive shaft 176 through which the mechanism for raising and lowering the screen frames above described is driven.

The mechanism for shifting the screen frames edgewise to aline different perforations with the selecting needles, comprises screw rods 206 (Figs. 2 and 9) which are screw-threaded through apertures in one of the bearing brackets 104 on the slides 106 which carry the square supporting rods 102 for the screen frame yokes 100. The screw rods 206 are each held from axial movement by a collar 208 and the head of a pinion 210 secured thereon and arranged at opposite sides of a bearing boss 211 on the machine frame. The screws are turned so as to shift the frame supporting slides 106 by means of rack teeth on a horizontal sliding rod 212 which engage the pinions 210. The rod 212 is operated by a pinion 214 (Fig. 3) secured on a stud shaft 216. The stud shaft 216 is adapted to be turned by a sprocket chain 218 which passes over sprocket wheels on the shaft 216 and a shaft 220 (Fig. 1) which is adapted to be turned by the operator by means of a hand-wheel 222 secured thereon. By turning the hand-wheel 222 one complete revolution the screen frames may all be shifted the distance between the centers of adjacent perforations in each line of perforations in the screens for the purpose above described. By turning the hand-wheel in the reverse direction, the screen frames may all be re-set in respect to their said edgewise position.

The card cylinders 76 (Figs. 1 and 12) are carried by shafts that are journaled in bearings on the ends of the front and rear side frames 78 (Fig. 18). The card cylinders are driven by a horizontal shaft 226 journaled in suitable bearings on the rear side frame of the base of the machine and having its ends connected with the cylinders through miter gears 228. This shaft 226 has a beveled gear 230 (Fig. 13) secured thereon which engages the beveled gear 144 carried by the intermittently and reversibly driven shaft 146 (Figs. 16 and 18). As it is also through this shaft 146 that the screen frames are raised and lowered, it will be apparent that the cards are successively presented to the punches in proper timed relation to the operation of the screens, and that upon reversal of movement of the screens the feeding movement of the cards will be correspondingly reversed.

The front and rear side frames 78 which carry the card cylinders, are mounted to slide horizontally on the front and rear sides of the base of the machine frame, the side frames having a dove-tail joint connection 232 with the base of the machine frame (Figs. 16 and 18). The side frames 78 are shifted longitudinally to shift the upper stretch of the chain of cards through connection with the hand-operable shaft 220 through which the screens are shifted edgewise as above described, so that the adjustment of the card to present different points thereon to the punches at the completion of each intermittent movement of the cards in one direction, and the edgewise shifting of the screen frames is accomplished simultaneously and correspondingly. The connection between the side frames 78 and the hand-wheel shaft 220 comprises screws 234 which extend through bearings in brackets 219 secured on the machine frame and are screw-threaded into bosses 221 on the side frames 78, each screw 234 being held from axial movement by collars secured thereon at opposite sides of the bracket 234. Each screw 234 is connected by beveled gears 236 with a vertical shaft 238, the two shafts 238 being connected through beveled gears 240 with the ends of the hand-operable shaft 220 (Fig. 14).

The punch block 80 is mounted to slide vertically in suitably formed guideways 242 (Figs. 14, 15 and 18) on the left side of the base of the frame of the machine. This punch block 80 is raised and lowered in proper timed relation to the feeding of the cards, through a connecting rod 244 having one end pivotally mounted on an eccentric pivot pin 246 and its other end on the wrist pin of a crank 248 formed on the drive shaft 184.

The throw of the punch block 80 may be varied by adjusting the eccentric pin 246. As shown the outer end of this eccentric pin has a segmental gear disk 243 secured thereon, and the pin is adapted to be held in fixed position by means of a bolt 245 which extends through an arcuate slot in the segmental gear disk 243. The eccentric pin may be conveniently turned to effect the desired adjustment by means of a suitable wrench 247 having a pinion 249 thereon which is adapted to mesh with the teeth of the segmental gear disk so that upon turning the wrench the desired adjustment may be effected.

The illustrated machine is provided with devices for properly centering each card prior to the punching thereof. These devices comprise dowel pins 250 (Figs. 12 and 18) and pin receiving holes 251 in plates 253 dovetailed on the top of the punch block 80 adjacent its ends. These dowel pins are mounted to slide vertically in bearings on brackets 252 which are carried by the card cylinder supporting frames 78. The dowel pins 250 are moved downwardly as the punch block 80 is raised, by means of levers 254 pivotally mounted on the bracket 252 and having corresponding ends pivotally connected with the upper ends of the dowel pins and their other ends connected through pin and slot connections with bracket arms 256 secured to the punch block. The dowel pins 250 tend to be held in raised position by means of springs 258 coiled about the upper portions thereof. With this construction, as the punch block is raised, the levers 254 act to force the dowel pins downwardly, and before the card engages the punches the pins are caused to enter the holes 259 in the card and the holes 251 in the plates 253, the pins having tapering ends so as to center the card. The centering holes 259 are the usual holes that receive the pins on the card feed cylinders. As the punch block and card are retracted, the dowel pins 250 are raised out of engagement with the card so as to permit the chain of cards to again be fed. As the brackets 252 for supporting the dowel pins 250 are carried by the supporting frames 78 for the card cylinders, the dowel pins are properly shifted when the card cylinders are shifted to shift the upper stretch of the chain of cards as above described, the pin and slot connection between the levers 254 and the bracket arms 256 permitting movement of the dowel pins and levers 254 independently of the bracket arms 256. The plates 253 are correspondingly shifted so as to properly position the dowel pin holes 251, through suitable dovetail sliding connections 257 with the vertical portions of the brackets 252.

The resetting plate 64 for the interfering pins 58 is secured at its ends on rods 260 (Figs. 15 and 16) which are mounted to slide longitudinally in suitable bearings on the machine frame. These rods 260 are provided with gear teeth that are engaged by pinions 262 secured on a transverse shaft 264. The shaft 264 is connected by arms 266 with the ends of rods 268 that are adapted to be operated by eccentrics 270 carried by the shaft 176. Through this mechanism, near the completion of the upward movement of the griffs, the re-setting plate 64 is moved to the right, viewing Fig. 15, so as to allow the springs 60 to shift the interfering pins 58 beneath the ends of any of the finding pins 54 that may be raised, and at the completion of each punching operation the re-setting plate 54 is shifted in the opposite direction to retract the interfering pins from beneath the ends of the finding pins, ready for the next operation of the griffs.

As will be evident to those skilled in the art, my invention permits various modifications without departing from the spirit thereof or the scope of the appended claims.

What I claim is:

1. A machine for perforating jacquard cards having, in combination, a bank of card perforating punches, means for moving a chain of cards in one direction to successively present them to said punches and for moving them in the opposite direction to again present them to the punches, and means for shifting the chain of cards longitudinally at the end of said first feeding movement to cause each card to be presented to said punches in a different position with relation to the punches during the next feeding movement.

2. A machine for perforating jacquard cards having, in combination, a bank of card perforating punches, means for successively presenting the cards of a chain to said punches, means for relatively moving each card and the bank of punches to perforate the card when presented to the punches, selecting devices for separately rendering said punches effective and ineffective during each punching operation, and controllable means for causing each card to be presented to said punches in different positions with relation to the punches preliminary to successive punching operations.

3. A machine for perforating jacquard cards having, in combination, a support over which a chain of cards may be fed, a set of punches arranged in rows transversely of the direction of the travel of the cards with the rows spaced apart, means for relatively moving said support and punches at predetermined intervals of time to perforate the cards, means for intermittently feeding the chain of cards over said support in one direction to successively present them in a predetermined position to said punches, and intermittently feeding them in the opposite direction to again successively present them to said punches, and means for shifting the chain of cards longitudinally with relation to said punches a predetermined distance after the completion of the first of said feeding movements of the cards so as to cause them to be presented to the punches in a different position during the next feeding movement thereof.

4. A machine for perforating jacquard cards having, in combination, a support over which a chain of cards may be fed, a set of punches arranged in rows transversely of the direction of the travel of the cards with the rows spaced apart, means for relatively moving said support and punches at predetermined intervals to perforate the cards, means for intermittently feeding the chain of cards over said support in one direction to successively present them in a predetermined position to said punches, and intermittently feeding them in the opposite direction to again successively present them to said punches, and means for shifting the cards with relation to said punches a predetermined distance after the completion of the first of said feeding movements of the cards so as to cause them to be presented to the punches in a different position during the next feeding movement thereof, and means for centering each card on said support preliminary to each punching operation thereon.

5. A machine for perforating jacquard cards having, in combination, a support over which a chain of cards may be fed, a set of punches arranged in rows transversely of the direction of the travel of the cards with the rows spaced apart, means for relatively moving said support and punches at predetermined intervals of time to perforate the cards, cylinders over which the cards pass arranged at opposite sides of said support, means for rotating said cylinders to intermittently feed the chain of cards over said support in one direction to successively present them in a predetermined position to said punches, and intermittently feed them in the opposite direction to again successively present them to said punches, and means for shifting said cylinders after the completion of the first of said feeding movements of the cards so as to cause the cards to be presented to the punches in a different position during the succeeding feeding movement thereof.

6. A machine for perforating jacquard cards having, in combination, cylinders for feeding a chain of cards, each card having apertures adjacent its ends, a support over which the cards are fed arranged between said cylinders, a set of punches arranged in rows transversely of the direction of the travel of the cards with the rows spaced apart, means for relatively moving said support and punches at predetermined intervals of time to perforate the cards, means for driving said cylinders to intermittently feed the chain of cards over said support in one direction to successively present them in a predetermined position to said punches, and intermittently feeding them in the opposite direction to again successively present them to said punches, means for shifting said cylinders after the completion of the first of said feeding movements of the cards so as to cause each card to be presented to the punches in a different position during the next feeding movement thereof, and means comprising pins entering said apertures in the ends of each card preliminary to each punching operation thereon to center each card on said support.

7. A machine for perforating jacquard cards having, in combination, a support over which a chain of cards may be fed, a set of punches arranged in rows transversely of the direction of the travel of the cards with the rows spaced apart, means for relatively moving said support and punches at predetermined intervals of time to perforate the cards, means for intermittently feeding the chain of cards over said support in one direction to successively present them in a predetermined position to said punches and intermittently feeding them in the opposite direction to again successively present them to said punches, means for shifting the cards longitudinally with relation to said punches a predetermined distance after the completion of the first of said feeding movements of the cards so as to cause them to be presented in a different position during the succeeding feeding movement thereof, and selecting devices for individually rendering said punches effective and ineffective during each of said punching operations.

8. A machine for perforating jacquard cards having, in combination, a support over which a chain of cards may be fed, a set of punches arranged in rows transversely of the direction of the travel of the cards with the rows spaced apart, means for relatively moving said support and punches at predetermined intervals of time to perforate the cards, means for intermittently feeding the chain of cards over said support in one direction to successively present them in a predetermined position to said punches and intermittently feeding them in the opposite direction to again successively present them to said punches, means for shifting the cards longitudinally with relation to said punches a predetermined distance after the completion of the first of said feeding movements of the cards so as to cause them to be presented to the punches in a different position during the next feeding movement thereof, selecting needles arranged in a single row and corresponding in number to the number of punches, and means controlled by said needles for individually rendering said punches effective and ineffective for each of said punching operations.

9. A machine for perforating jacquard cards havings, in combination, a pattern holder comprising a perforated screen having its perforations arranged in rows with the perforations in each row equally spaced apart, a row of selecting needles spaced apart so as to be adapted to be positioned in alinement with the endmost perforations of each series of three or more perforations of each row, means for relatively moving the holder and needles toward and from each other to cause the needles to enter and leave said endmost perforations of the several series in each row, means for relatively shifting the screen and needles so as to cause the needles to enter and leave perforations in the several rows successively, and means for relatively shifting the screen and needles to present the second perforation of the several series of the several rows to the needles during the subsequent operation of said screen and needles.

10. A machine for perforating jacquard cards having, in combination, a pattern holder comprising a perforated screen having its perforations arranged in rows with the perforations in each row equally spaced apart, a row of selecting needles spaced apart a distance equal to the distance between the endmost perforations of each series of three or more perforations of each row, means for moving the screen toward and from the needles to cause the needles to enter and leave said endmost perforations of the several series of each row when the row is positioned in alinement with the needles, means for shifting the screen so as to cause the needles to enter and leave corresponding perforations in the several rows of perforations successively, and means for shifting the screen to present the second perforation of the several series of the several rows to the needles during the subsequent operation of said screen and needles.

11. A machine for perforating jacquard cards having, in combination, a bank of card perforating punches, cylinders for supporting a chain of cards, means for rotating the cylinders in one direction to successively present the cards to said punches and for then rotating them in the reverse direction to again successively present the cards to said punches, and means for relatively shifting the bank of punches and said cylinders at the completion of each feeding movement of the cards to cause the cards to be successively presented to the punches in a different position during the succeeding feeding movement thereof.

12. In a machine for perforating jacquard cards, the combination of a pattern holder comprising a perforated screen having its perforations arranged in lines with the perforations in each line equally spaced apart, means for intermittently moving the screen in one direction to successively move each line to a definite position and then to intermittently move the screen in the opposite direction to again successively move each line to a definite position, a row of needles arranged in the plane of each line of perforations when the line is in said definite position and spaced apart a distance equal to the distance between the endmost needles of each series of three or more perforations of each line, means for relatively moving the screen and needles toward and from each other during each period of rest of said intermittent movements of the screen so as to cause the needles to enter and leave the perforations in alinement therewith, and means for shifting the screen edgewise in the direction of the lines of perforations a distance equal to the distance between the centers of adjacent perforations of each line.

13. In a machine for perforating jacquard cards the combination of a row of selecting needles arranged in a horizontal plane, a pattern holder comprising a perforated screen arranged in a vertical plane having its perforations arranged in horizontal and vertical lines, means for intermittently elevating said screen to successively present the lines of perforations to the needles and for intermittently lowering the screen to again present said lines to the needles, means for moving the screen toward and from the needles during each period of rest of the screen so as to cause the needles to enter and leave certain of the perforations of each line presented thereto, and means for shifting the screen edgewise a distance equal to the distance between the centers of adjacent perforations of each line at the completion of said elevating movement of the screen, the needles being spaced apart a distance equal to the distance between the endmost needles of each series of three or more perforations of each line.

14. In a machine for perforating jacquard cards, the combination of two perforated screens each having their perforations arranged in lines with the perforations of each line equally spaced apart, and the perforations of the several lines equally spaced apart, the screens being positioned face to face and their perforations being in alinement, and a pattern sheet having the pattern thereon perforated with the perforations arranged in alinement with perforations of the two screens.

15. In a machine for perforating jacquard cards, the combination of two perforated screens each having their perforations arranged in lines with the perforations of each line equally spaced apart, and the several lines of perforations equally spaced apart, the screens being positioned face to face and their perforations being in alinement, a pattern sheet having the pattern thereon perforated with the perforations arranged in alinement with perforations of the two screens, a holder for the screens, and means for intermittently moving the holder in one direction to successively move each line of perforations into a definite position, and for intermittently moving the holder in the oposite direction to again successively move each line of perforations into said definite position, and means for shifting the holder edgewise a distance equal to the distance between the centers of adjacent perforations of each line after the completion of the intermittent movement of the holder in the first-mentioned direction.

16. A machine for perforating jacquard cards having, in combination, a pattern screen having the perforations therein arranged in horizontal and vertical lines, the perforations in each line being spaced apart, a row of selecting needles equally spaced apart a distance corresponding to the distance between the first perforations of adjacent series of perforations in each horizontal line, means for moving the screen in one direction to successively present the horizontal lines of perforations to the needles, and for moving the screen in the reverse direction to again successively present the horizontal lines of perforations to the needles, means for shifting the screen edgewise horizontally a distance corresponding to the distance between adjacent perforations in each horizontal line at the completion of said movement of the screen in one direction, and means for relatively moving the screen and needles as each line of perforations is presented to the needles to cause the needles to enter the alined perforations in the screen.

In testimony whereof, I have signed my name to this specification.

RICHARD RUDDELL.